(12) United States Patent
Bennett et al.

(10) Patent No.: US 6,574,062 B1
(45) Date of Patent: Jun. 3, 2003

(54) DISK DRIVE COMPRISING A DEMAND LIMIT CIRCUIT FOR ENHANCING POWER MANAGEMENT DURING SPIN DOWN

(75) Inventors: George J. Bennett, Murrieta, CA (US); Robert P. Ryan, Mission Viejo, CA (US)

(73) Assignee: Western Digital Technologies, Inc., Lake Forest, CA (US)

( * ) Notice: Subject to any disclaimer, the term of this patent is extended or adjusted under 35 U.S.C. 154(b) by 0 days.

(21) Appl. No.: 09/552,403

(22) Filed: Apr. 19, 2000

(51) Int. Cl.[7] ............................................... G11B 19/02
(52) U.S. Cl. ....................................................... 360/69
(58) Field of Search ........................ 360/69, 75, 73.03, 360/77.05; 318/377, 634, 280

(56) References Cited

U.S. PATENT DOCUMENTS

| 4,204,127 | A | * | 5/1980 | Carter, II | 307/39 |
|---|---|---|---|---|---|
| 5,486,957 | A | * | 1/1996 | Albrecht | 360/75 |
| 5,504,402 | A | * | 4/1996 | Menegoli | 318/377 |
| 5,566,369 | A | * | 10/1996 | Carobolante | 360/75 |
| 5,638,307 | A | * | 6/1997 | Kamimura et al. | 713/321 |
| 5,682,273 | A | * | 10/1997 | Hetzler | 360/75 |
| 5,737,144 | A | * | 4/1998 | Ataee et al. | 360/75 |
| 5,808,438 | A | * | 9/1998 | Jeffrey | 318/634 |
| 5,889,629 | A | * | 3/1999 | Patton, III | 360/75 |
| 6,025,968 | A | * | 2/2000 | Albrecht | 360/75 |
| 6,094,020 | A | * | 7/2000 | Goretzki et al. | 318/109 |
| 6,140,784 | A | * | 10/2000 | Mazda | 318/280 |

* cited by examiner

*Primary Examiner*—David Hudspeth
*Assistant Examiner*—Fred F. Tzeng
(74) *Attorney, Agent, or Firm*—Milad G. Shara, Esq.; Howard H. Sheerlin, Esq.

(57) ABSTRACT

A disk drive is disclosed comprising a disk, a head, a voice coil motor (VCM) for actuating the head radially over the disk (the VCM having a voltage control input), and a spindle motor for rotating the disk, the spindle motor comprising a plurality of windings and a rotor rotatable at a variable spin rate wherein the rotor generates a back EMF (BEMF) voltage across the windings proportional to the spin rate of the rotor. A plurality of switching elements are coupled to the windings, and switch control logic generates switch control signals applied to the switching elements for commutating the spindle motor during normal operation and for generating an internal supply voltage Vi from the BEMF during a spin down mode, the internal supply voltage Vi applied to the voltage control input of the VCM for parking the head. A demand limit circuit disconnects the internal supply voltage Vi from the voltage control input of the VCM when the internal supply voltage Vi falls below a predetermined level, and reconnects the internal supply voltage Vi to the voltage control input of the VCM once the internal supply voltage Vi recharges to a predetermined level, thereby enhancing power management during the spin down mode.

12 Claims, 10 Drawing Sheets

DISK DRIVE COMPRISING A DEMAND LIMIT CIRCUIT FOR ENHANCING POWER MANAGEMENT DURING SPIN DOWN

BACKGROUND OF THE INVENTION

1. Field of the Invention

The present invention relates to disk drives for computer systems. More particularly, the present invention relates to a demand limit circuit for enhancing power management during spin down.

2. Description of the Prior Art

When the disk spins down in a disk drive it is important to park the head before the air bearing dissipates to prevent damage to the head and/or the disk. In disk drives wherein the head is parked in a landing zone on the disk, it is also important to brake the spindle motor as quickly as possible to minimize head wear. Conventionally, during a power failure the head is parked using the back EMF (BEMF) voltage present over the motor windings due to the angular momentum of the spindle and disk assembly. The current induced by the BEMF charges a capacitor to thereby generate an internal supply voltage which is applied to a voice coil motor (VCM) to park the head. Once the head is parked, a braking torque is applied to the spindle motor to stop it from rotating as quickly as possible in order to minimize head wear.

If the internal supply voltage drops below a certain threshold for an extended period of time during a power failure mode, the analog and digital circuitry which control the power down sequence may malfunction or shut down. This can typically occur if the VCM driver draws an excessive amount of current from the internal supply voltage. For example, if the head is in the middle of a seek operation when power failure occurs, the VCM driver may draw excessive current in order to decelerate the head. In another example, the VCM driver may draw excessive current in order to prevent the head from bouncing away from the parking latch at the end of the park operation. Either of these events may pull down the internal supply voltage beyond a safe level, thereby rendering the power down operation questionable.

This problem has been addressed in the prior art by designing disk drives with efficient spindle motors capable of providing sufficient BEMF voltage during power failure, and with efficient VCM motors which require less current to perform the head parking operation. However, this increases the overall cost of the disk drive since less efficient spindle and VCM motors are less expensive. Another known technique which alleviates this problem is to employ a "boost" circuit for "boosting" the internal supply voltage by periodically shorting the spindle motor windings. For example, U.S. Pat. No. 5,504,402 discloses a boost circuit for boosting the internal supply voltage by periodically grounding the spindle motor windings using a grounding switch. When the grounding switch is turned on (grounded), a current builds in the spindle motor windings due to the inductance and the BEMF. When the current reaches a predetermined level, the switch is turned off so that the current stored in the spindle motor windings charges a capacitor which boosts (and filters) the internal supply voltage. When the internal supply voltage reaches a predetermined level, the grounding switch is turned back on in order to recharge the current in the spindle motor windings. Although the boost circuit increases the available power so that less efficient spindle and VCM motors may be employed, further improvements are attainable.

Another problem identified with prior art disk drives is the inability to safely park the head unless the disk is rotating fast enough so that sufficient power is available to retract the head. Thus, the head is typically positioned over the landing zone on the disk while the disk is still rotating at a high RPM resulting in undesirable head wear. The landing zone is typically textured to reduce the stiction force during spin up; however, this textured surface also wears on the head during spin down. Because prior art techniques position the head over the landing zone while the disk is still spinning at a high RPM, head wear increases due to the increased time to brake the spindle motor. The prior art boost circuit alleviates this problem somewhat by increasing the internal supply voltage, thereby enabling head parking at a lower RPM which reduces the braking time while the head is over the landing zone. However, further improvements are attainable.

There is, therefore, a need to improve upon prior art techniques for generating an internal supply voltage used to park the head in a disk drive during spin down. In particular, there is a need to protect against the internal supply voltage from dropping below a safe level in order to maintain proper operation of the digital and analog circuitry responsible for the power down sequence. Further, there is a need to improve power management so that head parking is viable at a lower RPM to reduce head wear.

SUMMARY OF THE INVENTION

The present invention may be regarded as a disk drive comprising a disk, a head, a voice coil motor (VCM) for actuating the head radially over the disk (the VCM having a voltage control input), and a spindle motor for rotating the disk, the spindle motor comprising a plurality of windings and a rotor rotatable at a variable spin rate wherein the rotor generates a back EMF (BEMF) voltage across the windings proportional to the spin rate of the rotor. A plurality of switching elements are coupled to the windings, and switch control logic generates switch control signals applied to the switching elements for commutating the spindle motor during normal operation and for generating an internal supply voltage Vi from the BEMF during a spin down mode, the internal supply voltage Vi applied to the voltage control input of the VCM for parking the head. A demand limit circuit disconnects the internal supply voltage Vi from the voltage control input of the VCM when the internal supply voltage Vi falls below a predetermined level, and reconnects the internal supply voltage Vi to the voltage control input of the VCM once the internal supply voltage Vi recharges to a predetermined level, thereby enhancing power management during the spin down mode.

The present invention may also be regarded as a method of enhancing power management in a disk drive during a spin down mode, the disk drive comprising a disk, a head, a voice coil motor (VCM) for actuating the head radially over the disk (the VCM having a voltage control input), and a spindle motor for rotating the disk, the spindle motor comprising a plurality of windings and a rotor rotatable at a variable spin rate wherein the rotor generates a back EMF (BEMF) voltage across the windings proportional to the spin rate of the rotor. A plurality of switching elements are coupled to the windings, and switch control logic generates switch control signals applied to the switching elements for commutating the spindle motor during normal operation and for generating an internal supply voltage Vi from the BEMF during a spin down mode, the internal supply voltage Vi applied to the voltage control input of the VCM for parking the head. The method of enhancing power management during the spin down mode comprises the steps of disconnecting the internal supply voltage Vi from the voltage control input of the VCM when the internal supply voltage Vi falls below a predetermined level, and reconnecting the internal supply voltage Vi to the voltage control input of the VCM once the internal supply voltage Vi recharges to a predetermined level.

DESCRIPTION OF THE PREFERRED EMBODIMENTS

Demand Limit Circuit

Figure 4A:
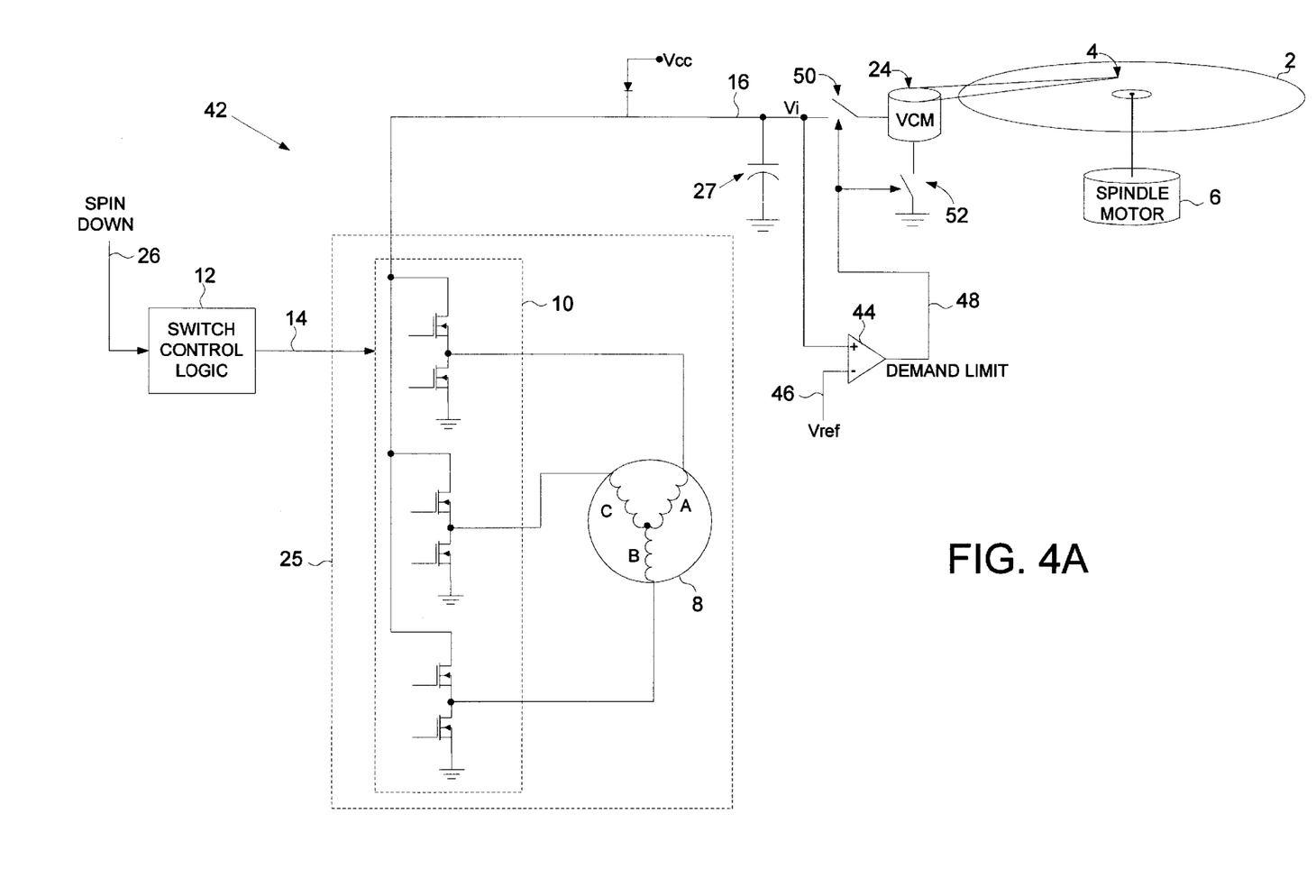
FIG. 4A shows an alternative embodiment of the present invention wherein the spin down circuitry comprises a demand limit circuit for disconnecting the internal supply voltage from the voltage control input of the VCM when the internal supply voltage falls below a predetermined level, and for reconnecting the internal supply voltage to the voltage control input of the VCM once the internal supply voltage recharges to a predetermined level, thereby enhancing power management during the spin down mode.

A disk drive 42 according to an alternative embodiment of the present invention is shown in FIG. 4A as comprising a disk 2, a head 4, a voice coil motor (VCM) 24 for actuating the head 4 radially over the disk 2 (the VCM 24 having a voltage control input) and a spindle motor 6 for rotating the disk 2, the spindle motor 6 comprising a plurality of windings 8 and a rotor rotatable at a variable spin rate wherein the rotor generates a back EMF (BEMF) voltage across the windings 8 proportional to the spin rate of the rotor. A plurality of switching elements 10 are coupled to the windings 8, and switch control logic 12 generates switch control signals 14 applied to the switching elements 10 for commutating the spindle motor 6 during normal operation and for generating an internal supply voltage Vi 16 from the BEMF during a spin down mode, the internal supply voltage Vi 16 applied to the voltage control input of the VCM 24 for parking the head 4. A demand limit circuit 44 disconnects the internal supply voltage Vi 16 from the voltage control input of the VCM 24 when the internal supply voltage Vi 16 falls below a predetermined level, and reconnects the internal supply voltage Vi 16 to the voltage control input of the VCM 24 once the internal supply voltage Vi 16 recharges to a predetermined level, thereby enhancing power management during the spin down mode.

In the embodiment of FIG. 4A, the demand limit circuit 44 comprises a comparator for comparing the internal supply voltage Vi 16 to a reference voltage Vref 46. The comparator 44 outputs a control signal 48 which controls the operation of switch 50 in order to disconnect the internal supply voltage from the voltage control input of the VCM 24 when the internal supply voltage Vi 16 falls below Vref 46.

In one embodiment, the winding within the VCM 24 is also grounded when the internal supply voltage Vi 16 falls below Vref 46. This is shown conceptually in FIG. 4A with the control signal 48 controlling the operation of switch 52. Grounding the winding in the VCM 24 helps maintain the load current flow while the internal supply voltage Vi 16 recharges to a level above Vref 46 which depends on the hysteresis of the comparator 44. Grounding the winding in the VCM 24 also helps to brake the VCM 24 which is typically the desired operation when the demand limit circuit 44 is activated, for example, when the VCM 24 is drawing excessive current attempting to brake the VCM 24 when a power failure occurs in the middle of a seek operation. The inductance ratio between the windings 8 in the spindle motor 6 and the winding in the VCM motor 24 is preferably selected such that during the voltage recovery period the VCM 24 operates normal or near normal. That is, the inductance of the winding in the VCM 24 is selected to be higher than that of the windings 8 in the spindle motor 6 so that the transient response of the VCM 24 is much slower than that of the spindle motor 6.

Figure 4B:
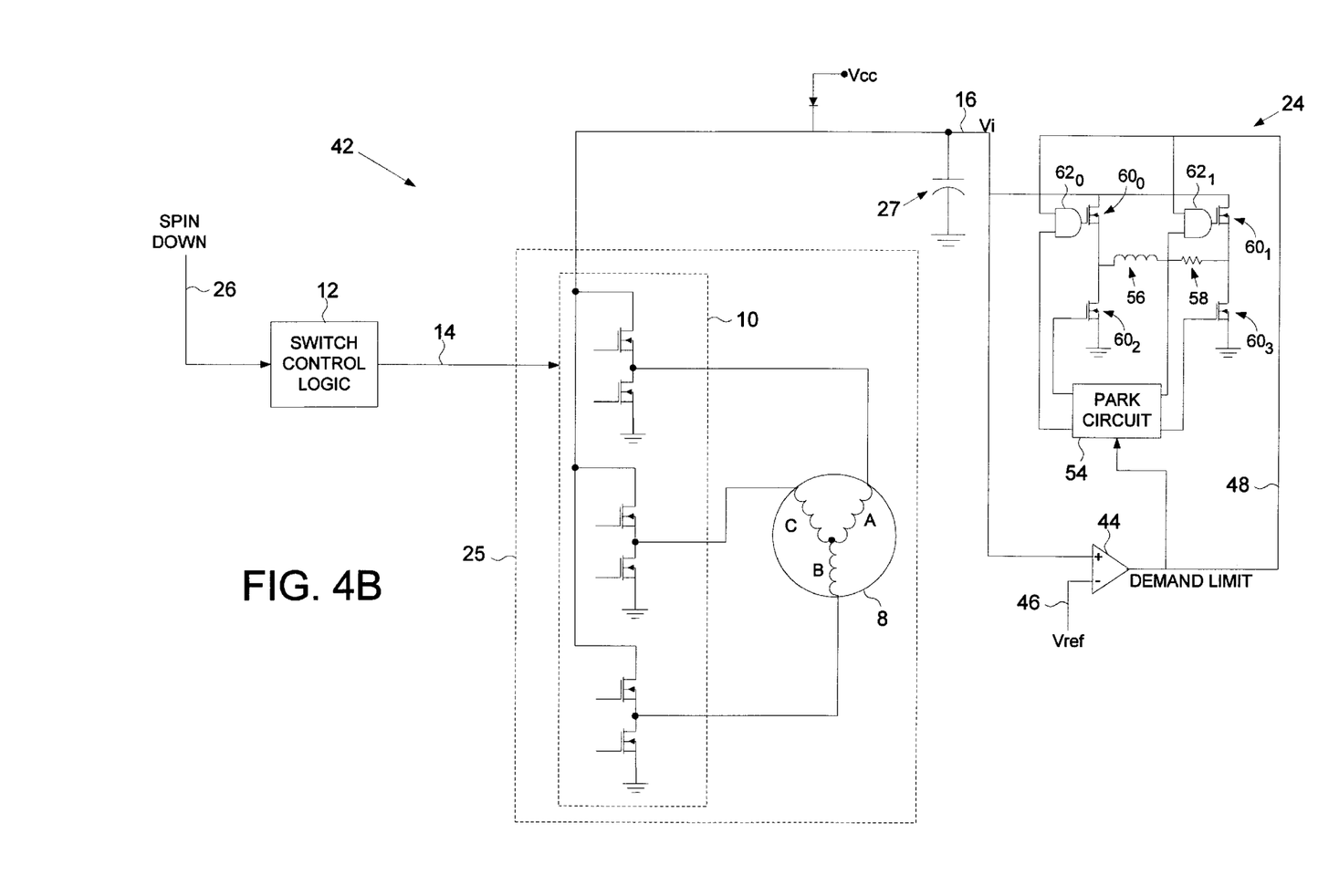
FIG. 4B shows further details of a suitable VCM for use in FIG. 4A

FIG. 4B shows further details of a suitable VCM 24 and park circuit 54 responsive to the control signal 48 generated by the demand limit circuit 44. The VCM 24 is modeled as a winding 56 and a resistor 58. Current flowing through the winding 56 is controlled by the park circuit 54 which generates control signals for controlling four switches $60_0$–$60_3$ in order to connect one end of the winding to the power rail and the other end to ground (through the resistor 58). The head 4 is actuated in one direction by turning on switches $60_0$ and $60_3$ and turning off switches $60_1$ and $60_2$, and actuated in the opposite direction by turning on switches $60_1$ and $60_2$ and turning off switches $60_0$ and $60_3$. During the power recovery period, the control signal 48 disconnects the VCM 24 from the internal supply voltage Vi 16 via AND gates $62_0$ and $62_1$, and the park circuit 54 turns on switches $60_2$ and $60_3$ in order to ground the winding 56 in the VCM motor 24.

Boost/Brake Circuit

Figures 1A, 1B:
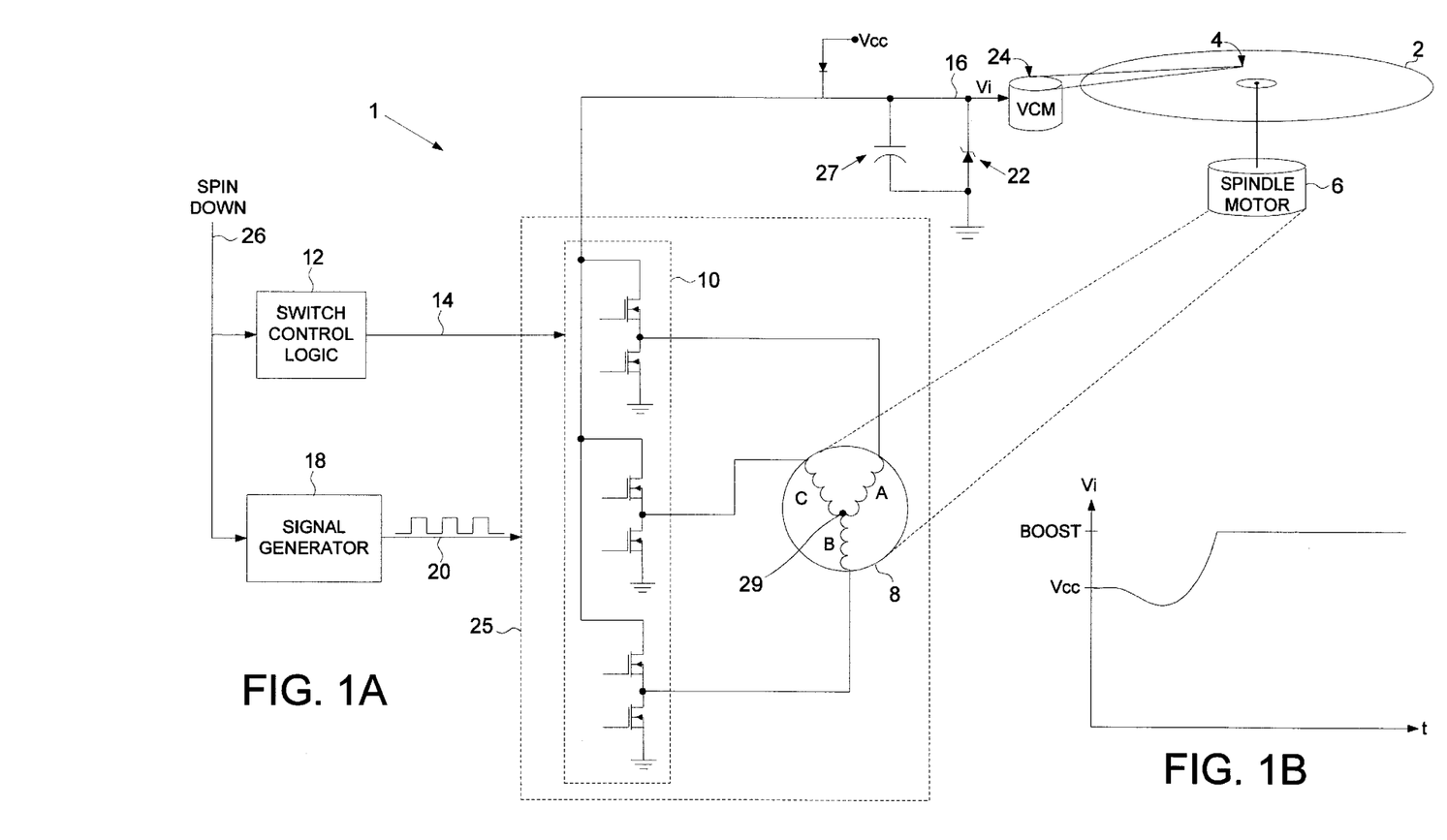
FIG. 1A shows a disk drive according to an embodiment of the present invention comprising a disk, a spindle motor for rotating the disk, a head actuated over the disk by a voice coil motor (VCM), and spin down circuitry comprising a clamp circuit for clamping an internal supply voltage generated from the spindle motor back EMF (BEMF) voltage, wherein the clamp circuit protects against an over-voltage condition without disabling the braking torque applied to the spindle motor.
FIG. 1B is a waveform illustrating the operation of the clamp circuit of FIG. 1A.

FIG. 1A shows a disk drive 1 according to an alternative embodiment of the present invention comprising a disk 2, a head 4 actuated radially over the disk 2, and a spindle motor 6 for rotating the disk 2, the spindle motor 6 comprising a plurality of windings 8 and a rotor rotatable at a variable spin rate, wherein the rotor generates a back EMF (BEMF) voltage across the windings 8 proportional to the spin rate of the rotor. A plurality of switching elements 10 are coupled to the windings 8, and switch control logic 12 generates switch control signals 14 applied to the switching elements 10 for commutating the spindle motor 6 during normal operation and for generating an internal supply voltage Vi 16 from the BEMF during a spin down mode, the internal supply voltage Vi 16 for parking the head 4. A signal generator 18 generates a periodic signal 20, the periodic signal 20 for periodically grounding the windings 8 during the spin down mode in order to boost the internal supply voltage Vi 16, wherein grounding the windings 8 applies a braking torque to the spindle motor 6. A power clamp circuit 22 clamps the internal supply voltage Vi 16 to a predetermined level to protect against an over-voltage condition without disabling the braking torque applied to the spindle motor 6.

The internal supply voltage Vi 16 is applied to a voice coil motor (VCM) 24 in order to park the head 4 during the spin down mode. In one embodiment, the internal supply voltage Vi 16 is used to park the head 4 in response to a power failure condition. In an alternative embodiment, the internal supply voltage Vi 16 is used to park the head 4 during a normal spin down mode, for example, when the disk drive is placed in an idle mode. The switch control logic 12 and the signal generator 18 are responsive to a spin down command 26 which is generated when the disk drive 1 enters the spin down mode.

The periodic signal 20 is shown in FIG. 1A as controlling a block 25 of the spin down circuitry in order to periodically ground the windings 8. In one embodiment, the periodic signal 20 is connected to the gates of the bottom switching elements 10 which have their source terminal connected to ground. Periodically turning these switching elements on and off periodically grounds the windings 8. When the switches are turned on to ground the windings 8, current builds in the windings. When the switches are turned off, the current stored in the windings 8 discharges into a charging capacitor 27 which boosts (and filters) the internal supply voltage Vi 16.

In an alternative embodiment, the periodic signal 20 is connected to the gates of the top switching elements 10 which have their drain connected to the power rail. Turing these switches on also causes current to build in the windings 8 similar to grounding the windings. Thus, the term "grounding" as used herein means to connect the windings 8 to a common point. In yet another embodiment, the periodic signal 20 grounds the center tap 29 of the windings 8 which also causes current to build in the windings 8.

The clamping action of the power clamp circuit 22 is illustrated in FIG. 1B. The power clamp circuit 22 clamps the internal voltage 16 to a maximum level which protects against an over voltage condition. The power clamp circuit 22 also acts as a load for draining current from the windings 8 in order to dissipate energy while braking the spindle motor 6. In this manner, the braking torque produced by boosting the internal supply voltage Vi 16 is always enabled, rather than regulating the boosted voltage which indirectly and unavoidably attenuates the breaking torque as in the prior art. Further, because the braking torque continuously brakes the spindle motor 6, there is less head wear since the spindle speed is reduced when the head reaches the landing zone on the disk 2. Still further, boosting and clamping the internal supply voltage Vi 16 ensures the VCM 24 has sufficient current to accelerate, decelerate, and latch the head, which protects against the spin down circuitry from malfunctioning.

In one embodiment, the spin down circuitry of FIG. 1A is implemented in an integrated circuit (IC), and the power clamp circuit 22 is implemented as an external power zener diode. This reduces the necessary size of the IC since power is dissipated externally by the power zener diode rather than by the integrated circuitry.

Figure 2:
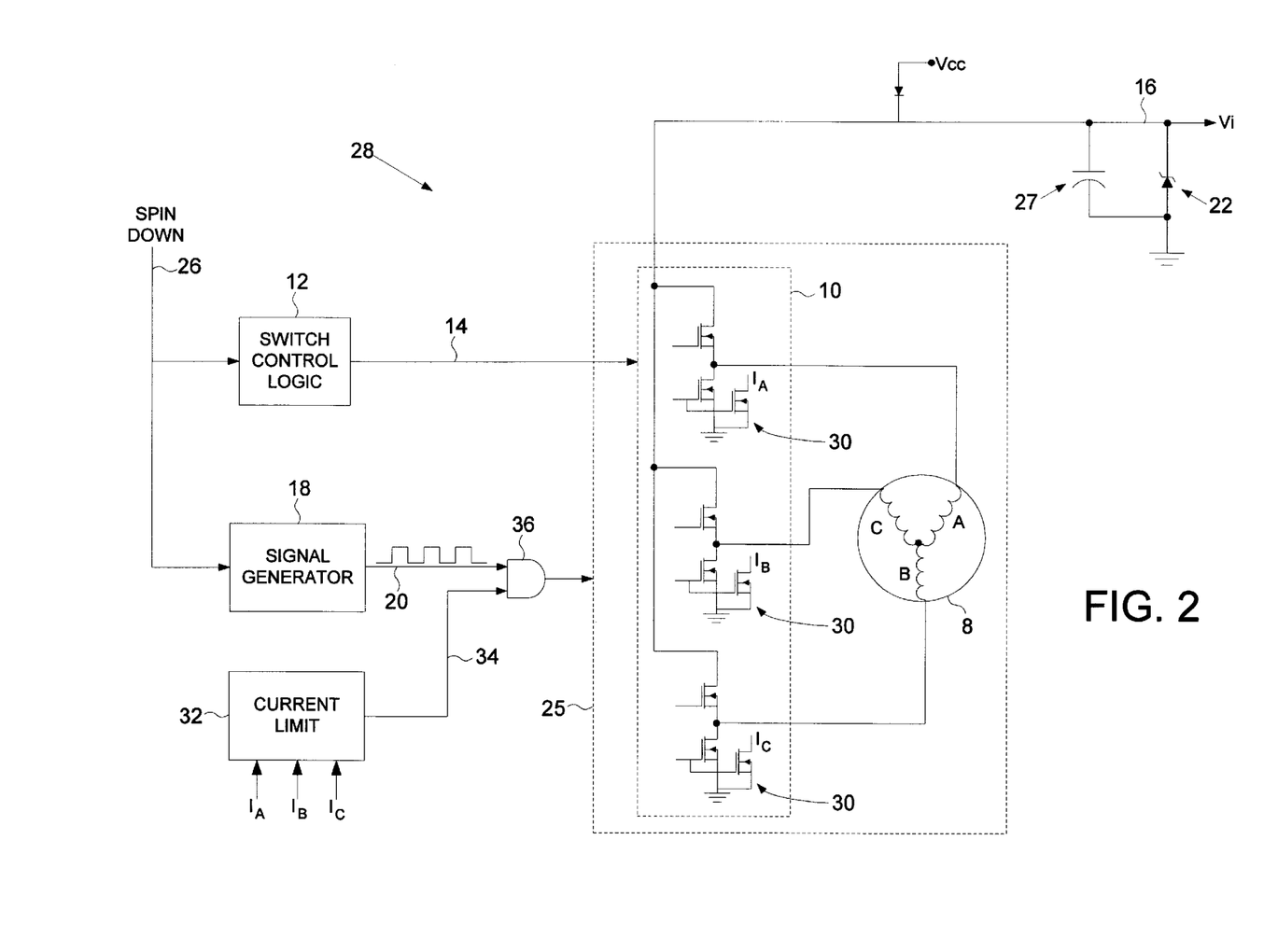
FIG. 2 shows an alternative embodiment of the present invention wherein the spin down circuitry comprises a plurality of current detectors, each current detector for measuring a current flowing through a respective commutation switching element, and a current limit circuit for generating a control signal which prevents a periodic signal from grounding the spindle motor windings if the current flowing through any one of the switching element exceeds a predetermined threshold.

An alternative embodiment of the present invention is shown in FIG. 2 as a disk drive 28 comprising a disk 2, a head 4 actuated radially over the disk 2, and a spindle motor 6 for rotating the disk 2, the spindle motor 6 comprising a plurality of windings 8 and a rotor rotatable at a variable spin rate, wherein the rotor generates a back EMF (BEMF) voltage across the windings 8 proportional to the spin rate of the rotor. A plurality of switching elements 10 are coupled to the windings 8, and switch control logic 12 generates switch control signals 14 applied to the switching elements 10 for commutating the spindle motor 6 during normal operation and for generating an internal supply voltage Vi 16 from the BEMF during a spin down mode, the internal supply voltage Vi 16 for parking the head 4. A signal generator 18 generates a periodic signal 20, the periodic signal 20 for periodically grounding the windings 8 during the spin down mode in order to boost the internal supply voltage Vi 16, wherein grounding the windings 8 applies a braking torque to the spindle motor 6. The disk drive 28 further comprises a plurality of current detectors 30, wherein each current detector 30 for measuring a current flowing through a respective one of the switching elements 10. A current limit circuit 32 generates a control signal 34 which prevents the periodic signal 20 from grounding the windings 8 if the current flowing through any one of the switching elements 10 exceeds a predetermined threshold.

In the embodiment of FIG. 2, the periodic signal 20 is disabled by the control signal 34 using an AND gate 36. However, other suitable methods for disabling the periodic signal 20 may be employed. The current limit circuit 32 protects the switching elements 10 from being damaged by excessive current generated from the windings 8. In effect, the current limit circuit 32 shortens the duty cycle of the periodic signal 20 in order to shorten the period that the windings 8 are grounded. This allows the spin down circuitry to brake the spindle motor 6 while operating at maximum current without damaging the switching elements 10.

In the embodiment shown in FIG. 2, each current detector 30 is implemented as a transistor with a gate connected to the gate of the switching element transistor. This forms a current mirror circuit whereby the current flowing through the current detector transistor mirrors the current flowing through the switching element transistor. As described in more detail below with reference to FIG. 6, the current limit circuit 32 comprises a summing circuit for summing the currents $I_A$, $I_B$ and $I_C$ flowing through the current mirror circuits, wherein the summed current is compared to a threshold. The summed current represents the peak current flowing through any one of the switching elements 10, and the periodic signal 20 is disabled if the summed current exceeds a predetermined threshold. Other suitable techniques for detecting the current flowing through each of the switching elements 10 may be employed, such as a resistor connected in series with the source terminal of the transistor in each of the bottom switching elements and ground.

Figure 3:
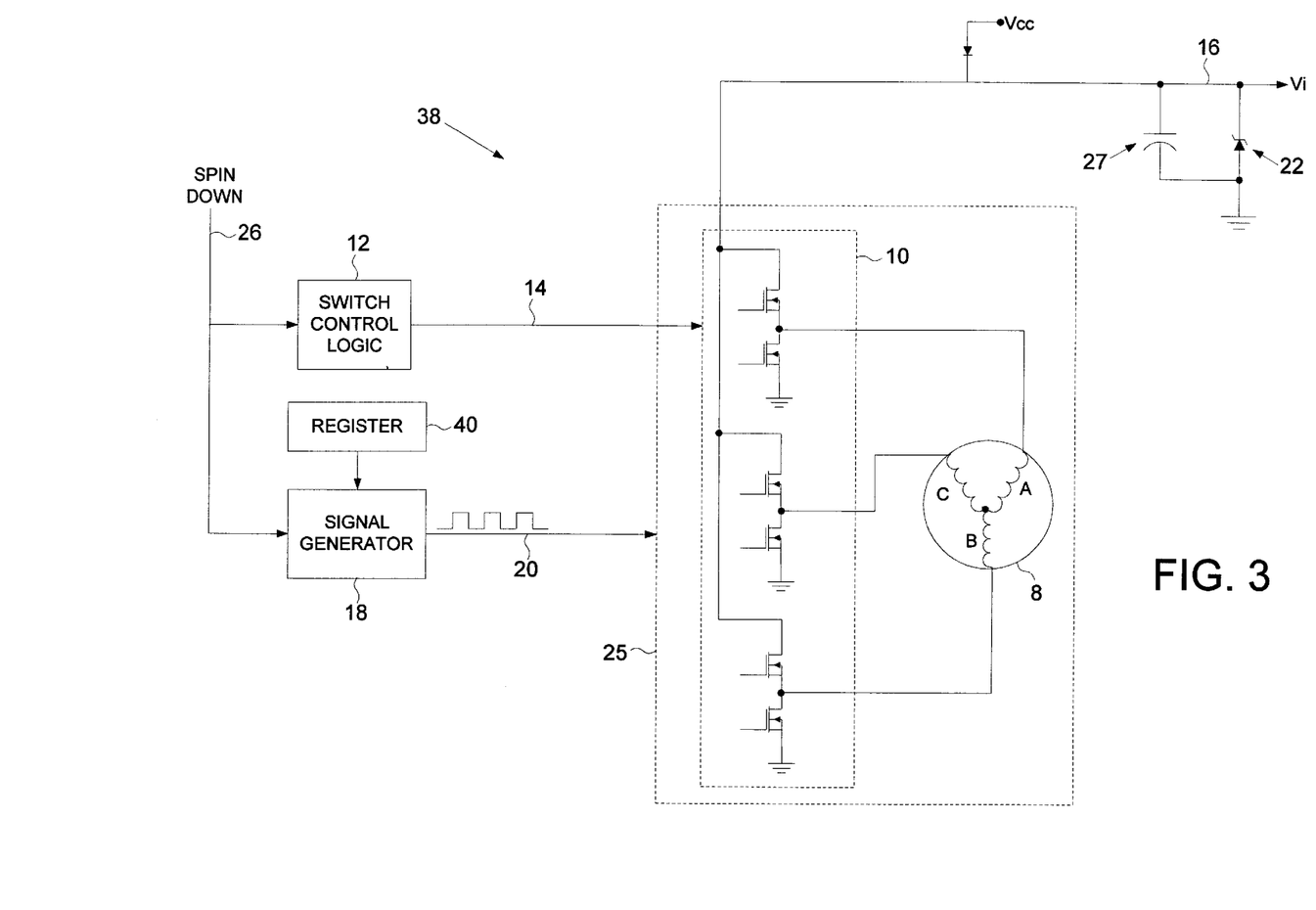
FIG. 3 shows an alternative embodiment of the present invention wherein the spin down circuitry comprises a programmable signal generator for generating a periodic signal, the periodic signal for periodically grounding the spindle motor windings during the spin down mode in order to boost the internal supply voltage, and a programmable register for storing a digital value for adjusting a frequency characteristic of the periodic signal.

An alternative embodiment of the present invention is shown in FIG. 3 as a disk drive 38 comprising a disk 2, a head 4 actuated radially over the disk 2, and a spindle motor 6 for rotating the disk 2, the spindle motor 6 comprising a plurality of windings 8 and a rotor rotatable at a variable spin rate, wherein the rotor generates a back EMF (BEMF) voltage across the windings 8 proportional to the spin rate of the rotor. A plurality of switching elements 10 are coupled to the windings 8, and switch control logic 12 generates switch control signals 14 applied to the switching elements 10 for commutating the spindle motor 6 during normal operation and for generating an internal supply voltage Vi 16 from the BEMF during a spin down mode, the internal supply voltage Vi 16 for parking the head 4. A programmable signal generator 18 generates a periodic signal 20, the periodic signal 20 for periodically grounding the windings 8 during the spin down mode in order to boost the internal supply voltage Vi 16, wherein grounding the windings 8 applies a braking torque to the spindle motor 6. The disk drive 38 further comprises a programmable register 40 for storing a digital value for adjusting a frequency characteristic of the periodic signal 20.

In one embodiment, the programmable register 40 stores a digital value which adjusts the frequency of the periodic signal 20. In another embodiment, the programmable register 40 stores a digital value which adjusts the duty cycle of the periodic signal 20. In this manner, the spin down circuitry is less dependent on system dynamics in order to increase design flexibility and to enable the same spin down circuitry to be employed over a wide variety of disk drives. In one embodiment, the operating frequency and duty cycle of the periodic signal are calculated based on design specifications for a particular family of disk drives. In an alternative embodiment, the frequency and duty cycle are calibrated for each individual disk drive in order to customize the power management and braking control, thereby increasing manufacturing tolerances and design flexibility.

Another advantage realized through a programmable periodic signal 20 is the ability to operate the spin down circuitry in different modes of operation, particularly with respect to braking the spindle motor 6. For example, in an embodiment disclosed in greater detail below, the spin down circuitry operates in three modes: fixed duty cycle mode shortened by current limiting, 95% duty cycle mode during pre-full-brake, and 100% duty cycle mode during full-brake. In an alternative embodiment, the duty cycle of the periodic signal 20 is continuously adjusted toward 100% relative to the rotation speed of the disk 2. This embodiment obviates the current limit circuit 32 of FIG. 2 by gradually increasing the duty cycle in order to protect against excessive current in the switching elements 10.

Composite Spin Down Circuitry

Figure 5:
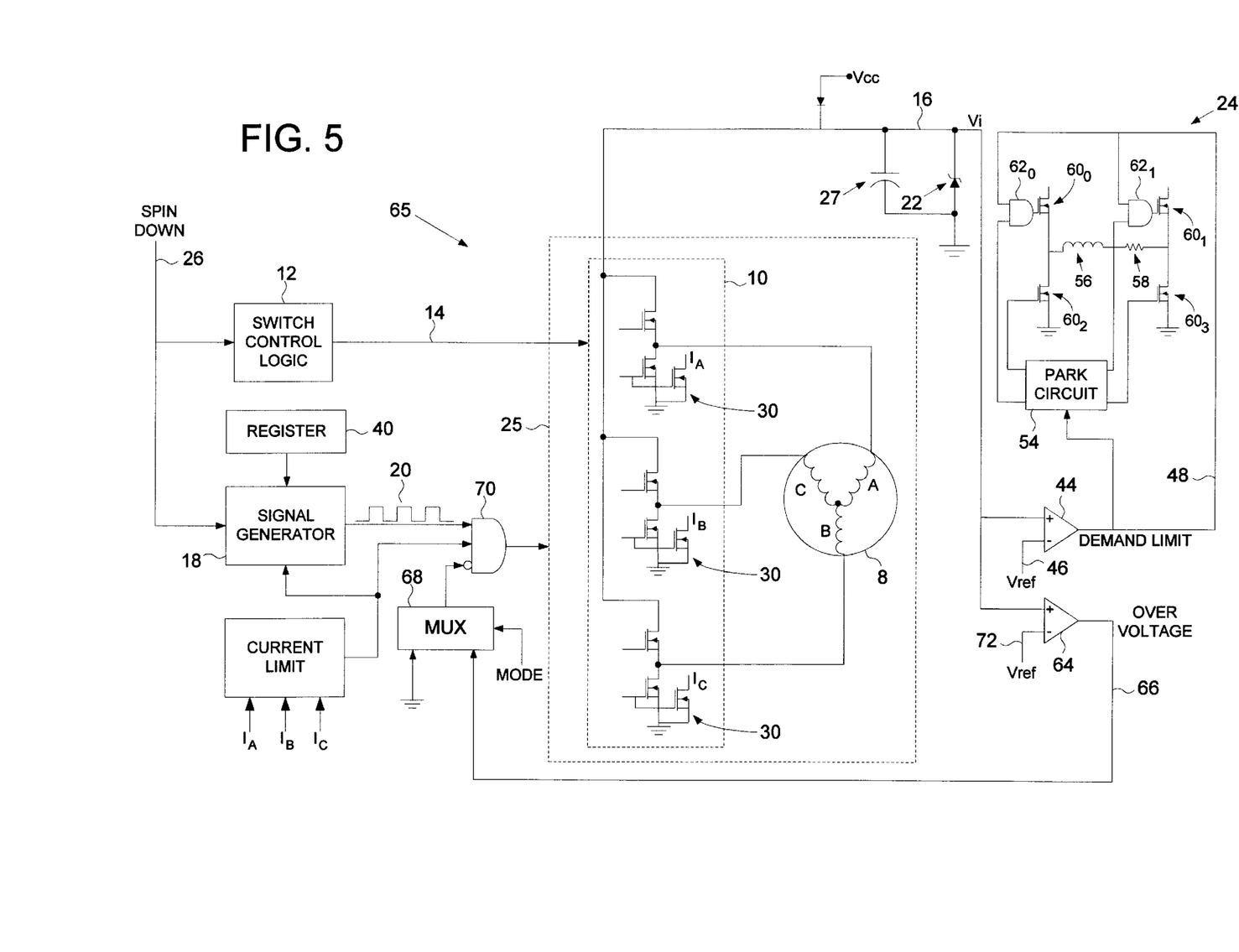
FIG. 5 shows an embodiment of the present invention employing the spin down circuitry of FIG. 1A, FIG. 2, FIG. 3 and FIG. 4.

The various embodiments shown in FIG. 1A through FIG. 4B may be implemented independently from one another as each embodiment enhances power management, braking control, and design flexibility. However, in the preferred embodiment of the present invention, the above embodiments are combined into a composite embodiment shown in FIG. 5. The disk drive 65 of FIG. 5 further comprises an over voltage detector 64 for implementing a different mode of operation: over-voltage limit mode. In the over-voltage limit mode, the internal supply voltage Vi 16 is limited rather than clamped by the power clamp circuit 22 in order to extend the duration that power is generated internally during a power failure mode, thereby providing additional time to perform spin down operations such as parking the head 4. The over voltage detector 64 generates a control signal 66 which is selected through multiplexer 68 and applied to AND gate 70 in order to disable the boosting action of the periodic signal 20 when the internal supply voltage Vi 16 exceeds a predetermined level. In the embodiment of FIG. 5, the over voltage detector 64 is implemented as a comparator 64 for comparing the internal supply voltage Vi 16 to a reference voltage 72.

Figure 6:
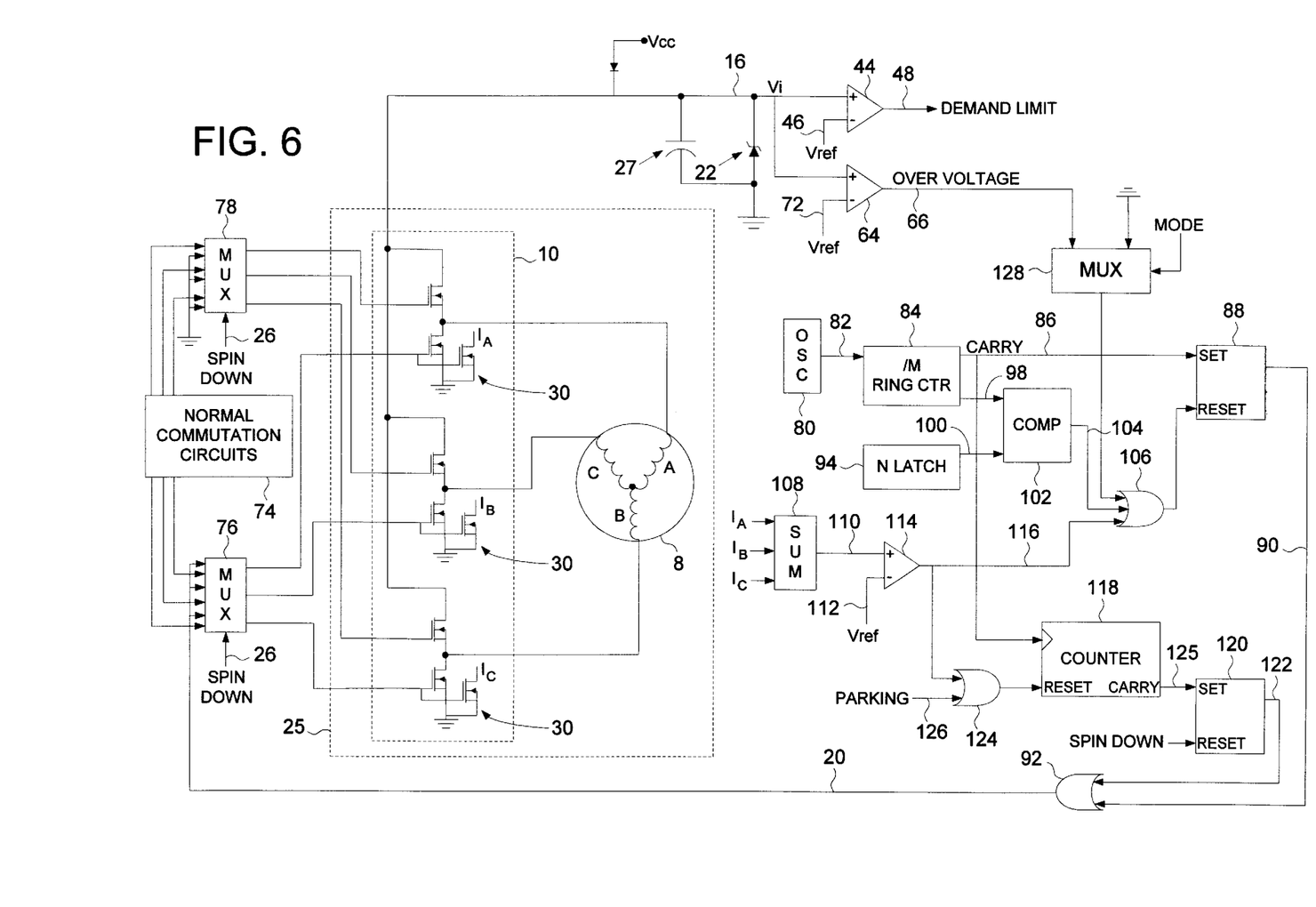
FIG. 6 shows implementation details for an embodiment of the present invention.

Further details of suitable circuitry for implementing the composite embodiment of the present invention are shown in FIG. 6. During normal operation of the disk drive, normal commutation circuits 74 generate switch control signals which pass through multiplexers 76 and 78 and are applied to the switching elements 10 in order to commutate the windings 8 of the spindle motor 6. During a spin down operation, the spin down signal 26 selects ground through multiplexer 78 in order to turn off the top switching elements 10, and it selects the periodic signal 20 through multiplexer 76 in order to periodically turn on the bottom switching elements 10 in order to periodically ground the windings 8 and thereby boost the internal supply voltage Vi 16.

The signal generator 18 for generating the periodic signal 20 comprises an oscillator 80 for generating a clock signal 82 for clocking a /M ring counter 84. The period M of the counter is programmable in order to program the frequency of the periodic signal 20. The ring counter 84 activates a carry signal 86 every time it reaches terminal count, and then it begins counting over from zero. The carry signal 86 sets a register 88 to a high state, wherein the output 90 of the register 88 is the periodic signal 20 enabled by an OR gate 92. A programmable register 94 is programmed with a value N which controls the duty cycle of the periodic signal 20. The current value of the /M ring counter 84 is output via line 98 and compared to the value N on line 100 using a comparator 102. When the two values are equal, the comparator 102 activates a signal 104 which resets register 88 via an OR gate 106, thereby setting the output 90 of the register 88 to a low state.

The current limit circuit 32 of FIG. 2 is implemented in FIG. 6 as a summing circuit 108 for summing the currents $I_A$, $I_B$, and $I_C$ detected in the switching elements 10 (via the current mirrors 30). The resulting summed signal 110 is compared to a reference voltage 112 at comparator 114. If the summed signal 110 exceeds the reference voltage 112, then the output 116 of the comparator 114 resets register 88 via OR gate 106, thereby disabling the periodic signal 20 and its boosting action. In effect, the current limit circuit 108 shortens the duty cycle of the periodic signal 20 to protect the switching elements 10 from excessive current.

The carry signal 86 from the /M ring counter 84 is also applied to the clock input of counter 118. If a current limit is detected (output of comparator 114 is active) before a predetermined number of cycles of the periodic signal 20, then the periodic signal 20 remains enabled via register 120 and OR gate 92. The periodic signal 20 also remains enabled via OR gate 124, register 120, and OR gate 92 if a park signal 126 is active indicating that the park circuitry is still parking the head 4. If a current limit is not detected within the predetermined number of cycles of the periodic signal 20, then it is assumed the disk 2 has spun down to a safe level to allow full braking of the spindle motor 6 by grounding the windings 8 until the disk 2 stops spinning. Thus, the reset input of counter 118 will not be activated by the output of OR gate 124, and the carry output 125 of counter 118 will set the output 122 of register 120 to a high state thereby setting the periodic signal 20 to a high state via OR gate 92 in order to turn on and leave on the bottom switching elements 10 and ground the spindle motor windings 8.

In one embodiment, before entering the full brake mode, the duty cycle of the periodic signal 20 is changed to a high value (e.g., 95%) by programming register 94 with an appropriate value. In this manner, the spin down circuitry of FIG. 6 will remain active for a short period to allow the output of the current limit circuit (output 116 of comparator 114) to be monitored. If a current limit is detected, the spin down circuitry is placed back in the fixed duty cycle mode by reprogramming register 94 with the fixed duty cycle value (e.g., 60% duty cycle).

In the over-voltage limit mode, the control signal 66 generated by the over voltage detector 64 is applied to OR gate 106 through multiplexer 128. When the internal supply voltage exceeds Vref 72, the control signal 66 resets register 88, thereby shortening the duty cycle of the periodic signal 20.

In one embodiment, the circuitry for generating the periodic signal 20 shown in FIG. 6 is also used to generate a conventional PWM signal used to control the current in the windings 8 of the spindle motor 6 during normal operation, thereby controlling the torque generated by the spindle motor 6 during normal operation.

Figure 7A:
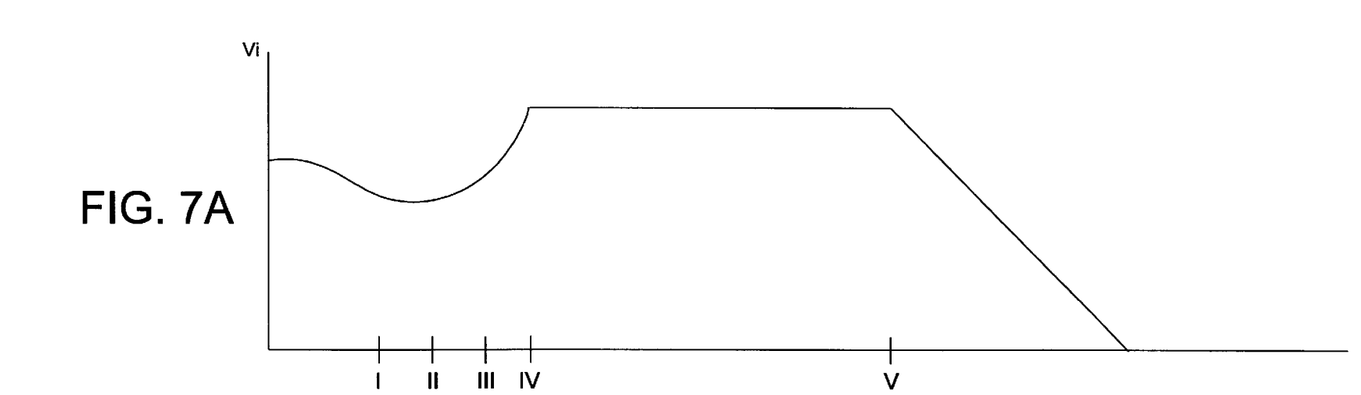
FIGS. 7A and 7B are time lines illustrating an embodiment of the present invention wherein the internal supply voltage is clamped by the clamp circuit while the spindle current is limited by the current limit circuit.
Figure 7B:
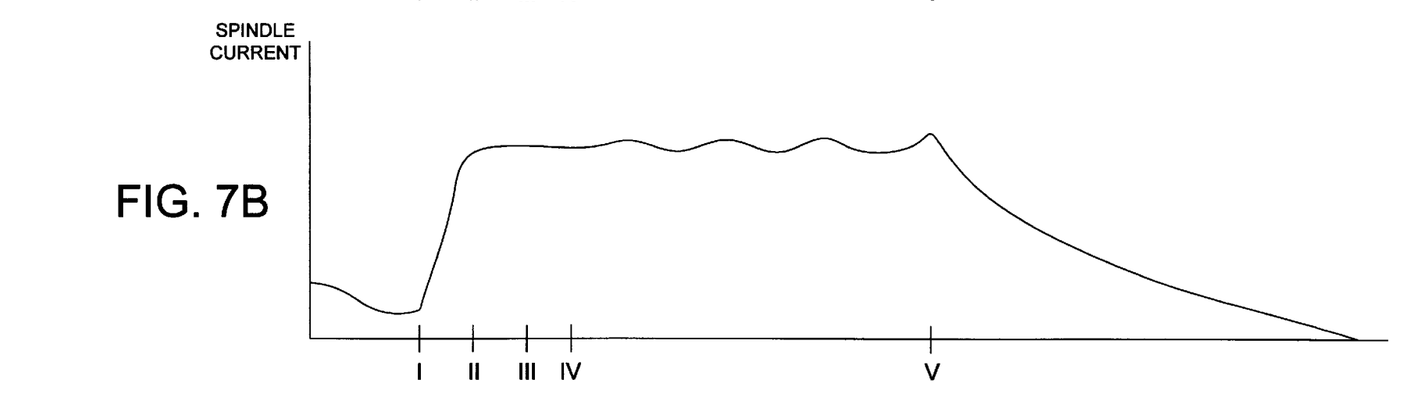

The operation of the composite circuitry shown in FIG. 6 is better understood with reference to the waveforms shown in FIGS. 7A and 7B which illustrate the operation of the spin down circuitry when the internal supply voltage Vi 16 is clamped by the power clamp circuit 22. FIG. 7A is a waveform of the internal supply voltage during a power failure, and FIG. 7B is a waveform of the current in the windings 8 of the spindle motor 6 during a power failure. The abscissa in the waveforms of FIGS. 7A and 7B is divided into five regions: I, II, III, IV and V.

In region I, power has failed and the internal supply voltage Vi 16 begins to drift downward. When the disk drive detects the power failure, the spin down signal 26 is activated and register 94 in FIG. 6 is programmed with an appropriate value to generate a fixed duty cycle periodic signal 20 in order to periodically short the spindle motor windings 8. During the shorting period, current builds in the windings 8, and during the non-short period, the current in the windings 8 charges capacitor 27 which supplies power to the internal supply voltage Vi 16. Since current builds in the windings 8, braking action also begins and the RPM starts dropping.

In region II, the current in the windings 8 exceeds a predetermined threshold which activates the current limit circuit 114 in order to protect the switching elements 10 from excessive current. The current limit control signal 116 shortens the duty cycle of the periodic signal 20 via OR gate 106 and register 88.

In region III, the internal supply voltage Vi 16 begins to rise as the duty cycle of the periodic signal 20 is shortened since more time is allocated to charging capacitor 27. Depending on the design of the spindle motor windings 8, region II and III may overlap.

In region IV, the internal supply voltage Vi 16 is clamped by the power clamp circuit 22 (e.g., using an external power zener diode). Since spindle motor current is high, the external power zener diode begins dissipating several watts of power. This ability to disipate power outside of the IC is one reason the IC can be put in a smaller package even though it can handle much higher RPM. Typically, final head parking occurs in this region. Instead of the typical 100 milliamps previously available, this approach can provide up to an amp of peak current to the VCM 24, a 10:1 improvement. The higher current protects against the spin down circuitry from malfunctioning or failing during head bounce and peak loading.

In region V, the final brake sequence is initiated. Register 94 in FIG. 6 is programmed with an appropriate value to generate the periodic signal 20 with a high duty cycle (e.g., 95%) in order to apply near maximum braking torque to the windings 8 while keeping the spin down circuitry alive for a short period. If a current limit is detected during this period, the spin down circuitry is placed back in the fixed duty cycle mode by reprogramming register 94 with the appropriate fixed duty cycle value (e.g., 60% duty cycle). If a current limit is not detected during this period, then the periodic signal 20 is programmed for a 100% duty cycle (via register 120) such that the windings 8 are continuously grounded and a full braking torque is applied to the spindle motor 6 in order to stop the disk 2 rotation as quickly as possible.

Figure 8A:
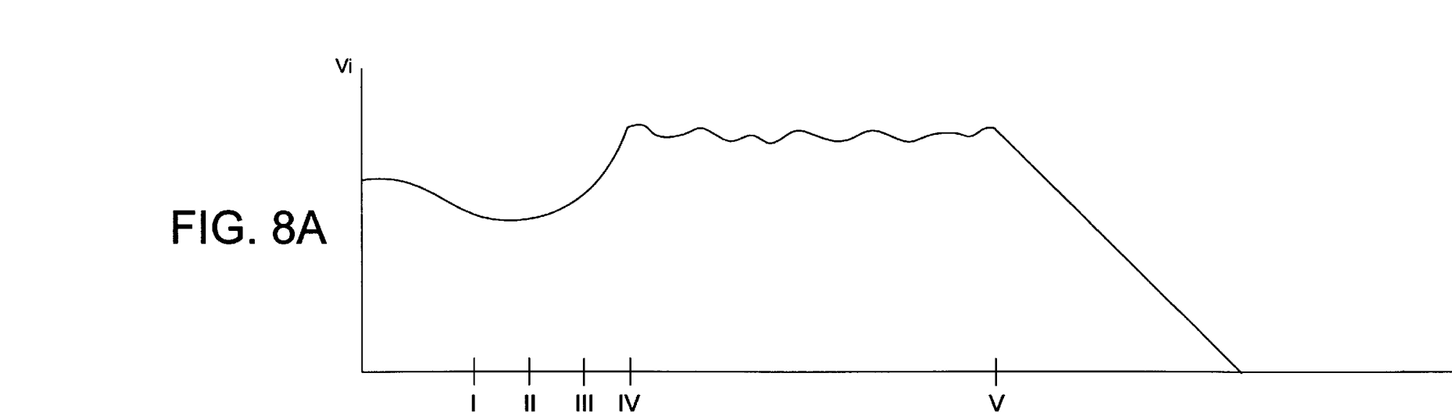
FIGS. 8A and 8B are time lines illustrating an embodiment of the present invention wherein the internal supply voltage is regulated using a voltage feed back loop in order to extend the spin down operation.
Figure 8B:
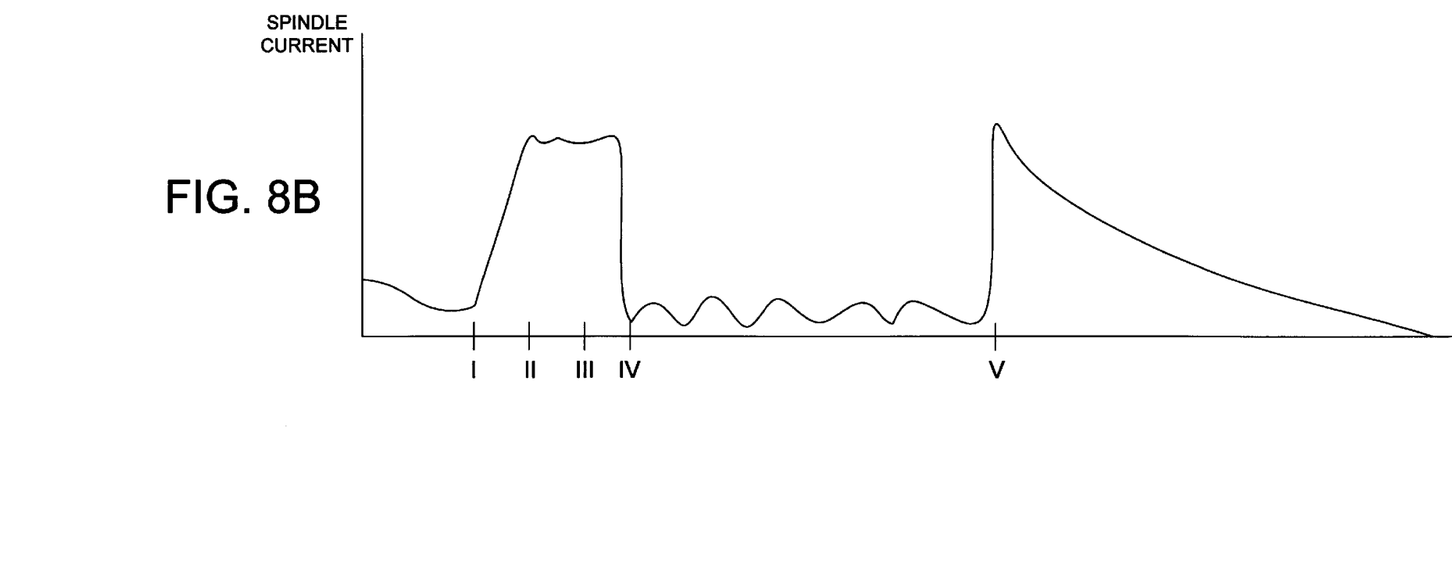

FIGS. 8A and 8B illustrate the voltage regulation mode of operation which is the same as that of FIGS. 7A and 7B except that when the internal supply voltage Vi 16 exceeds a predetermined level, the boost/brake action of the periodic signal 20 is disabled in region IV rather than clamping the internal supply voltage Vi 16 as in FIG. 7A. While the boost/brake action is disabled, the current in the windings 8 reduces as illustrated in FIG. 8B.

Figure 9A:
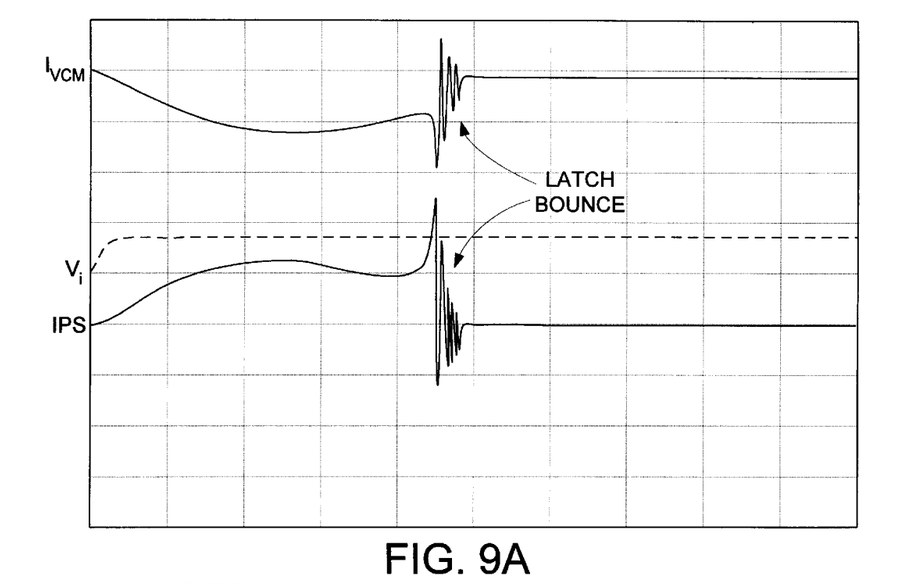
FIG. 9A is a time line illustrating an embodiment of the present invention wherein the boosting action of the spin down circuitry provides sufficient power to accelerate, decelerate and latch the head during a park operation.
Figure 9B:
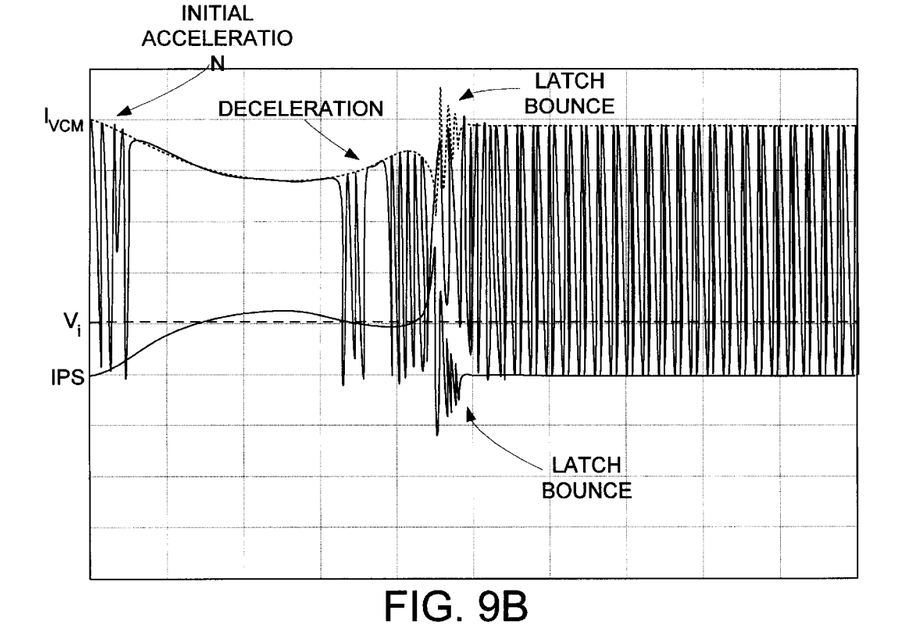
FIG. 9B is a time line illustrating an embodiment of the present invention wherein the demand limit circuit limits the maximum current drawn from the internal supply voltage by the VCM to enable head parking at lower RPM.

FIGS. 9A and 9B further illustrate the operation of the spin down circuitry of FIG. 6 with respect to the current $I_{VCM}$ in the windings 8, the internal supply voltage Vi 16, and the inches per second (IPS) of the head 4 during the park operation. FIG. 9A is an example wherein the boost action of the spin down circuitry provides sufficient power to decelerate, accelerate and latch the head 4 without requiring the assistance of the demand limit circuit 44 of FIG. 4A. In other words, the disk 2 may be spinning at a sufficiently high RPM during the park operation, or the VCM 24 and spindle motor 6 may be efficient (and expensive).

FIG. 9B illustrates the head parking operation wherein the demand limit circuit 44 of FIG. 4A is used to protect the spin down circuitry from malfunctioning due to the VCM 24 drawing excessive current from the internal supply voltage Vi 16. During periods where the VCM 24 demands excessive current, the internal supply voltage Vi 16 is disconnected from the voltage control input of the VCM 24 to allow the internal supply voltage Vi 16 to recharge. Because the ratio of the windings between the VCM 24 and the spindle motor 6 is high, the internal supply voltage Vi 16 is disconnected from the voltage control input of the VCM 24 for a short period which helps to maintain proper operation of the VCM 24 while protecting the spin down circuitry. The demand limit circuit 44 is intended for disk drives where the head 4 is parked at a lower RPM in order to reduce head wear, or in disk drives which employ a less efficient (and less expensive) VCM 24 and/or spindle motor 6.

We claim:

1. A disk drive comprising:
   (a) a disk;
   (b) a head;
   (c) a voice coil motor (VCM) for actuating the head radially over the disk, the VCM having a voltage control input;
   (d) a spindle motor for rotating the disk, the spindle motor comprising a plurality of windings and a rotor rotatable at a variable spin rate wherein the rotor generates a back EMF (BEMF) voltage across the windings proportional to the spin rate of the rotor;
   (e) a plurality of switching elements coupled to the windings;
   (f) switch control logic for generating switch control signals applied to the switching elements for commutating the spindle motor during normal operation and for generating an internal supply voltage from the BEMF during a spin down mode, the internal supply voltage applied to the voltage control input of the VCM for parking the head;
   (g) a demand limit circuit for disconnecting the internal supply voltage from the voltage control input of the VCM when the internal supply voltage falls below a predetermined level, and for reconnecting the internal supply voltage to the voltage control input of the VCM once the internal supply voltage recharges to a predetermined level, thereby enhancing power management during the spin down mode.

2. The disk drive as recited in claim 1, wherein the demand limit circuit further grounds the voltage control input of the VCM when the internal supply voltage falls below the predetermined level.

3. The disk drive as recited in claim 1, further comprising a signal generator for generating a periodic signal, the periodic signal for periodically grounding the windings during the spin down mode in order to boost the internal supply voltage, wherein grounding the windings applies a braking torque to the spindle motor.

4. The disk drive as recited in claim 3, further comprises a clamp circuit for clamping the internal supply voltage to a predetermined level to protect against an over-voltage condition while applying a braking torque to the spindle motor.

5. The disk drive as recited in claim 3, further comprising:
   a plurality of current detectors, each current detector for measuring a current flowing through a respective one of the switching elements; and
   a current limit circuit for generating a control signal which prevents the periodic signal from grounding the windings if the current flowing through any one of the switching element exceeds a predetermined threshold.

6. The disk drive as recited in claim 3, further comprising a programmable register for storing a digital value for adjusting a frequency characteristic of the periodic signal.

7. A method of enhancing power management in a disk drive during a spin down mode, the disk drive comprising:
   a disk;
   a head;
   a voice coil motor (VCM) for actuating the head radially over the disk, the VCM having a voltage control input;
   a spindle motor for rotating the disk, the spindle motor comprising a plurality of windings and a rotor rotatable at a variable spin rate wherein the rotor generates a back EMF (BEMF) voltage across the windings proportional to the spin rate of the rotor;
   a plurality of switching elements coupled to the windings; and
   switch control logic for generating switch control signals applied to the switching elements for commutating the spindle motor during normal operation and for generating an internal supply voltage from the BEMF during a spin down mode, the internal supply voltage applied to the voltage control input of the VCM for parking the head;
   the method of enhancing power management during the spin down mode comprising the steps of:
   (a) disconnecting the internal supply voltage from the voltage control input of the VCM when the internal supply voltage falls below a predetermined level; and
   (b) reconnecting the internal supply voltage to the voltage control input of the VCM once the internal supply voltage recharges to a predetermined level.

8. The method of enhancing power management as recited in claim 7, further comprising the step of grounding the voltage control input of the VCM when the internal supply voltage falls below the predetermined level.

9. The method of enhancing power management as recited in claim 7, further comprising the step of generating a periodic signal, the periodic signal for periodically grounding the windings during the spin down mode in order to boost the internal supply voltage, wherein grounding the windings applies a braking torque to the spindle motor.

10. The method of enhancing power management as recited in claim 9, further comprises the step of clamping the internal supply voltage to a predetermined level to protect against an over-voltage condition while applying a braking torque to the spindle motor.

11. The method of enhancing power management as recited in claim 9, further comprising the steps of:
    measuring a current flowing through each of the switching elements; and
    preventing the periodic signal from grounding the windings if the current flowing through any one of the switching element exceeds a predetermined threshold.

12. The method of enhancing power management as recited in claim 9, further comprising the step of programmably adjusting a frequency characteristic of the periodic signal.

* * * * *